US012688122B2

(12) United States Patent (10) Patent No.: US 12,688,122 B2

Lee et al. (45) Date of Patent: Jul. 21, 2026

(54) MEMORY USAGE IN MANAGED RUNTIME APPLICATIONS

(71) Applicant: Intel Corporation, Santa Clara, CA (US)

(72) Inventors: Han B. Lee, Sammamish, WA (US); Simonjit Dutta, Seattle, WA (US); Rodolfo G. Esteves Jaramillo, Sammamish, WA (US); Poornima S. Kumar, Bellevue, WA (US); Chanchala Roy Lairikyengbam, Redmond, WA (US); Weilin Wang, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 56 days.

(21) Appl. No.: 17/156,593

(22) Filed: Jan. 24, 2021

(65) Prior Publication Data

US 2021/0141723 A1 May 13, 2021

(51) Int. Cl.
*G06F 12/02* (2006.01)
*G06F 9/54* (2006.01)

(52) U.S. Cl.
CPC .......... *G06F 12/0269* (2013.01); *G06F 9/544* (2013.01); *G06F 2212/702* (2013.01)

(58) Field of Classification Search
CPC ................. G06F 12/0269; G06F 9/544; G06F 2212/702; G06F 12/0276
See application file for complete search history.

(56) References Cited

U.S. PATENT DOCUMENTS

| | | | | |
|---|---|---|---|---|
| 7,389,395 | B1 * | 6/2008 | Garthwaite | G06F 12/0253 |
| | | | | 711/E12.009 |
| 9,483,415 | B2 * | 11/2016 | Tung | G06F 12/123 |
| 10,203,897 | B1 * | 2/2019 | Cheah | G06F 3/061 |
| 10,382,751 | B1 * | 8/2019 | Zhao | H04N 19/105 |
| 2009/0254705 | A1 * | 10/2009 | Abali | G06F 12/0897 |
| | | | | 711/E12.016 |
| 2011/0119318 | A1 * | 5/2011 | Daynes | G06F 12/0276 |
| | | | | 707/816 |
| 2017/0220256 | A1 * | 8/2017 | Balasubramonian | |
| | | | | G06F 3/0656 |
| 2017/0336984 | A1 * | 11/2017 | Nicol | G06F 3/0661 |
| 2018/0314447 | A1 * | 11/2018 | Driever | G06F 12/1081 |

(Continued)

*Primary Examiner* — Sean D Rossiter
(74) *Attorney, Agent, or Firm* — Alliance IP, LLC

(57) ABSTRACT

Live objects in heap memory exceeding a threshold size and that have not been recently accessed are compressed or offloaded to secondary memory or storage. Compressing or offloading an object can further be based on how old the object is, which can be determined based on how many garbage collections the object has survived. Objects comprising references to other objects can be split into two sub-objects, one containing value fields that is compressed or offloaded and one containing reference fields that remains uncompressed in heap memory. Heap memory can undergo compaction after objects are compressed or offloaded. Compression accelerators can be used for compression and the decision of whether to compress or offload an object can be based on accelerator throughput, latency, availability, as well as other computing system metrics or characteristics. The compressing and offloading of objects and subsequent compaction can make more heap memory available for object allocation.

14 Claims, 8 Drawing Sheets

(56) References Cited

U.S. PATENT DOCUMENTS

2019/0056883 A1*  2/2019  Kim ...................... G06F 12/128
2020/0142604 A1*  5/2020  Moore .................. G06F 3/0661

* cited by examiner

BEFORE COMPACTION

ATER COMPACTION

500

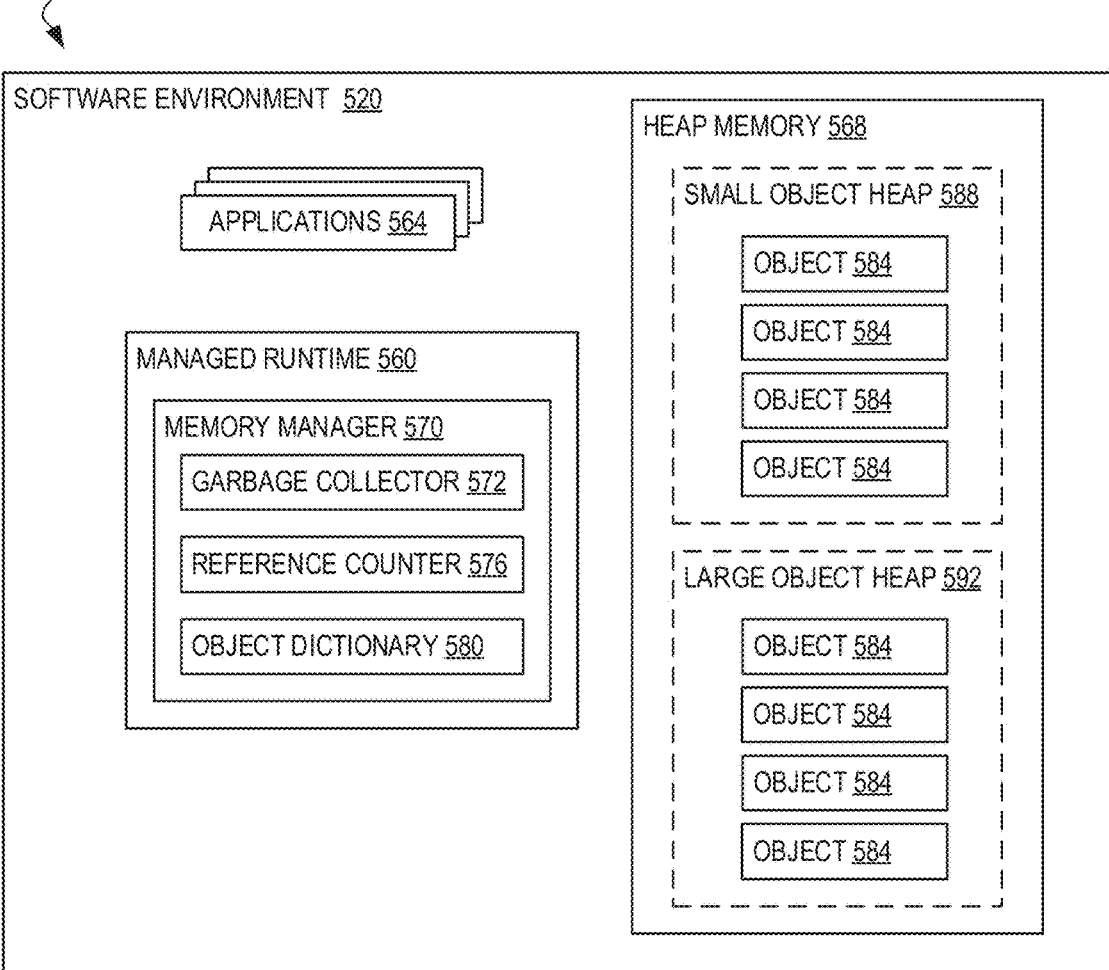

SOFTWARE ENVIRONMENT 520

APPLICATIONS 564

MANAGED RUNTIME 560

MEMORY MANAGER 570

GARBAGE COLLECTOR 572

REFERENCE COUNTER 576

OBJECT DICTIONARY 580

HEAP MEMORY 568

SMALL OBJECT HEAP 588

OBJECT 584

OBJECT 584

OBJECT 584

OBJECT 584

LARGE OBJECT HEAP 592

OBJECT 584

OBJECT 584

OBJECT 584

OBJECT 584

HARDWARE 510

INTEGRATED CIRCUIT COMPONENT 524

PROCESSING UNIT 532

L1$ 536

L2$ 538

L3$ 540

PROCESSING UNIT 534

L1$ 536

L2$ 538

L3$ 540

LLC 542

COMPRESSION ACCELERATOR 544

DRAM 528

SECONDARY MEMORY/ STORAGE 530

PCM 546

FLASH 548

SSD 550

HDD 552

IDENTIFY OBJECT REACHABLE FROM APPLICATION EXECUTING ON COMPUTING
SYSTEM
610

COMPRESS OBJECT OR MOVE OBJECT TO
SECONDARY MEMORY OR STORAGE 620

DETERMINE THAT SIZE OF OBJECT IS LARGER THAN
THRESHOLD SIZE
630

DETERMINE THAT OBJECT HAS NOT BEEN RECENTLY ACCESSED
640

MEMORY USAGE IN MANAGED RUNTIME APPLICATIONS

BACKGROUND

Managed runtimes perform automatic memory management. In some runtimes, garbage collectors are used to identify objects in heap memory that are reachable by an application and reclaim the heap memory occupied by unreachable objects. The reclaimed heap memory can be used for allocating new objects.

BRIEF DESCRIPTION OF THE DRAWINGS

FIG. 5 is a simplified block diagram of a first example computing system in which technologies described herein may be implemented.

DETAILED DESCRIPTION

Figure 1:
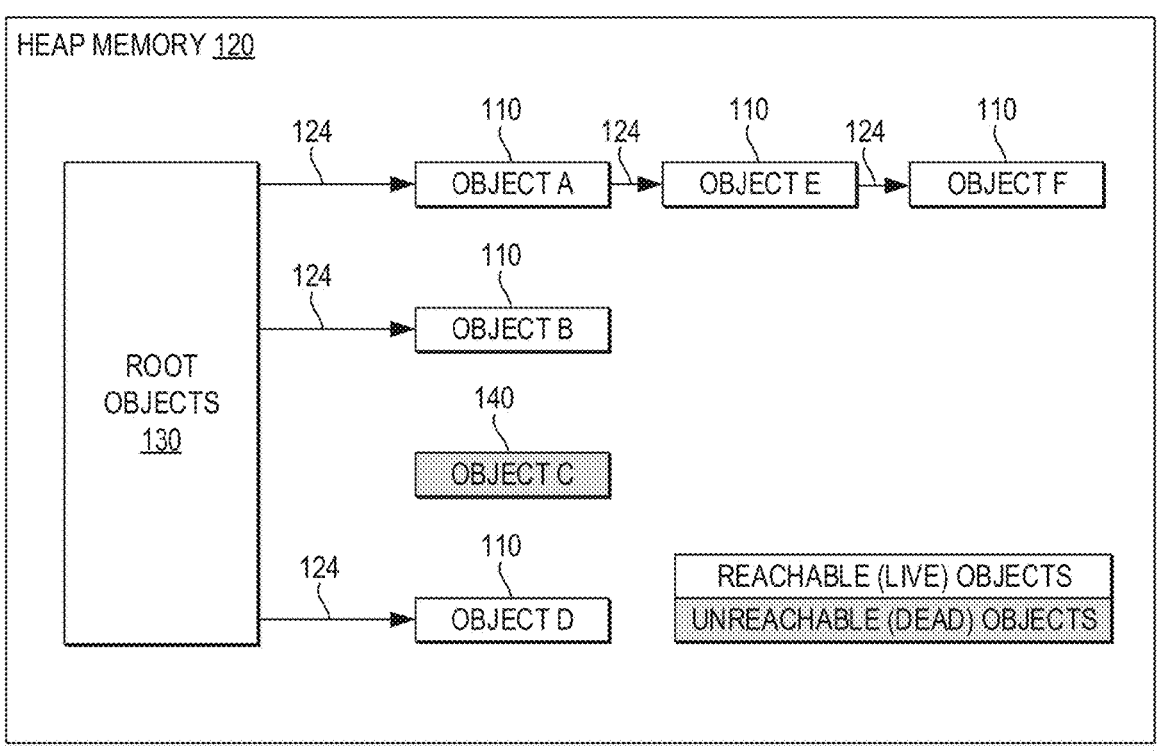
FIG. 1 illustrates an example marking of objects in heap memory as part of a garbage collection memory management approach.

Applications, especially those that execute on a managed runtime (e.g., Java virtual machine (JVM), Microsoft® .NET common language runtime (CLR)), are increasingly expected to handle larger and larger datasets. To meet this requirement, applications carry out a large amount of memory allocations for objects, which increases the risk of an application experiencing an out-of-memory exception or poor performance. Memory allocation can fail even though there is enough free memory due to not enough contiguous free memory being available to support an allocation. To alleviate this issue, some runtimes perform memory compaction as part of garbage collection tasks, in which objects are moved around in memory to make larger contiguous segments of memory available for allocation. However, this approach does not change the amount of data that can be allocated to heap memory.

Application developers could keep a large amount of data in heap memory and still maintain good application performance but at the cost of having to manually identify objects to be offloaded to secondary memory or storage, serializing them, and writing them out, and then reversing the process when the objects are needed again. This cost places an additional burden on developers in terms of the increased complexity of algorithms, data structures, and/or implementation, along with increased complexity in code maintainability. The memory management technologies disclosed herein avoid such costs and provide for applications to support large datasets without suffering from poor performance. At a general level, live objects are selectively compressed or offloaded to secondary memory or storage.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common element and indicate different instances of like elements being referred to. Such adjectives do not imply an element or item so described must be in a given sequence, either temporally or spatially, in ranking, or any other manner. "Connected" may indicate elements are in direct physical or electrical contact with each other and "coupled" may indicate elements cooperate or interact with each other, but they may or may not be in direct physical or electrical contact.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the instructions contained in the software or firmware are not actively being executed by the system, device, platform, or resource.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

Reference is now made to the drawings, which are not necessarily drawn to scale, wherein similar or same numbers may be used to designate the same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

FIG. 1 illustrates an example marking of objects in heap memory as part of a garbage collection-based memory management approach. The marking phase can be performed as part of a "mark and sweep" garbage collection approach to automated memory management in managed runtimes. In the marking phase, objects in a heap memory 120 that are reachable via one or more references 124 from a set of root objects 130 are identified as live objects 110 and objects that are unreachable from the root objects 130 are identified as dead objects 140. The dead objects 140 are considered "garbage" and the heap memory occupied by the dead objects 140 is reclaimed for future object allocations. An application working with a large data set can allocate a large number of objects and maintain references to enough of them such that there would be enough live objects to prevent additional objects from being allocated. That is, there may not be enough contiguous free memory to support additional allocations. This can result in out-of-memory exceptions or cause the performance of the application to suffer.

Generational garbage collectors are commonly used in existing runtimes. In generational garbage collectors, objects are placed in different "generations". New objects are allocated in a "young" generation, and as they continue to survive garbage collections, they are promoted to "older" generations. Generational garbage collectors can perform faster collections by taking advantage of the fact that most objects die young. Some garbage collectors also separate smaller objects and larger objects into different buckets, such as a large object heap, and a small object heap to reduce the cost of compaction.

The heap memory 120 can be located in one or more memories that reside at one or more top layers of the computing system's memory hierarchy, the top layers comprising memories that are smaller, faster, and located closer to processing units than memories or storage belonging to lower layers of the memory hierarchy. Thus, the heap memory can be located in one or more layers of cache memory, such as level 1 (L1), level 2 (L2), level 3 (L3), level 4 (L4), and last-level cache (LLC) memories (which can be static random-access memories (SRAMs)), and dynamic random-access memory (DRAM). L1 and L2 caches reside on the same integrated circuit die as processing units, while lower-level caches (e.g., L3, L4, LLC) can reside on the same integrated circuit die as the processing units or on separate integrated circuit dies from the processing units but still located in the same integrated circuit component package (e.g., multi-chip package (MCP), multi-chip module (MCM)) as the processing units. DRAM can be located off-package from the processing units or located on-package (e.g., embedded DRAM, high bandwidth memory (HBM)).

One or more layers of non-volatile memory or storage reside below the DRAM memory layer in the computing system memory hierarchy. These layers of non-volatile memory or storage can include, for example, chalcogenide-based phase-change non-volatile memory (e.g., Intel® 3D XPoint-based memories), flash memory, solid-state drives, and hard drives. In memory hierarchies comprising a chalcogenide-based phase-change memory layer, a portion of the heap memory can be located in this layer. As used herein, the phrases "secondary memory" and "secondary storage" can refer to any memory or storage located at a layer in the memory hierarchy below the bottom-most layer in the memory hierarchy storing at least a portion of the heap memory. Thus, if a portion of the heap memory is stored in DRAM, offloading an object to secondary memory or storage can comprise moving an object from DRAM to flash memory, a solid-state drive, chalcogenide-based phase-change non-volatile memory, or a hard disk drive.

As used herein, the term "integrated circuit component" refers to a packaged or unpacked integrated circuit product. A packaged integrated circuit component comprises one or more integrated circuit dies. In one example, a packaged integrated circuit component contains one or more processing units and a solder ball grid array (BGA) on an exterior surface of the package. In one example of an unpackaged integrated circuit component, a single monolithic integrated circuit die comprises solder bumps attached to contacts on the die. The solder bumps allow the die to be directly attached to a printed circuit board. An integrated circuit component can comprise one or more of any computing system component described or referenced herein, such as a processing unit (e.g., system-on-a-chip (SoC), processor cores, graphics processing unit (GPU), accelerator), I/O controller, chipset processor, memory, or network interface controller.

The improved memory management techniques described herein comprise identifying live objects that satisfy a set of criteria and either compressing those objects in heap memory or offloading (or spilling) them to secondary memory or storage. In some embodiments, objects that are compressed or offloaded exceed a certain size, are older than a certain age, and have not been recently accessed. Larger objects are selected for compression or offloading as compressing larger objects can be more efficient than compressing smaller ones, and the relative overhead associated with offloading a larger object is smaller than that associated with offloading a smaller object. Compressing or offloading objects that have not been recently accessed makes it less likely that objects will be decompressed or loaded from secondary memory or storage shortly after being compressed or offloaded. Compressing or offloading older objects makes it more likely that the resources spent to compress or offload an object are not wasted as an application will more likely access a long-lived object at some point in the future.

Objects that contain references to other objects are split into two sub-objects, one containing the reference fields of the referenced object and the other containing the value fields of the referenced objects. The sub-object comprising value fields is compressed or offloaded while the sub-object comprising reference fields is kept uncompressed in heap memory.

Figure 2:
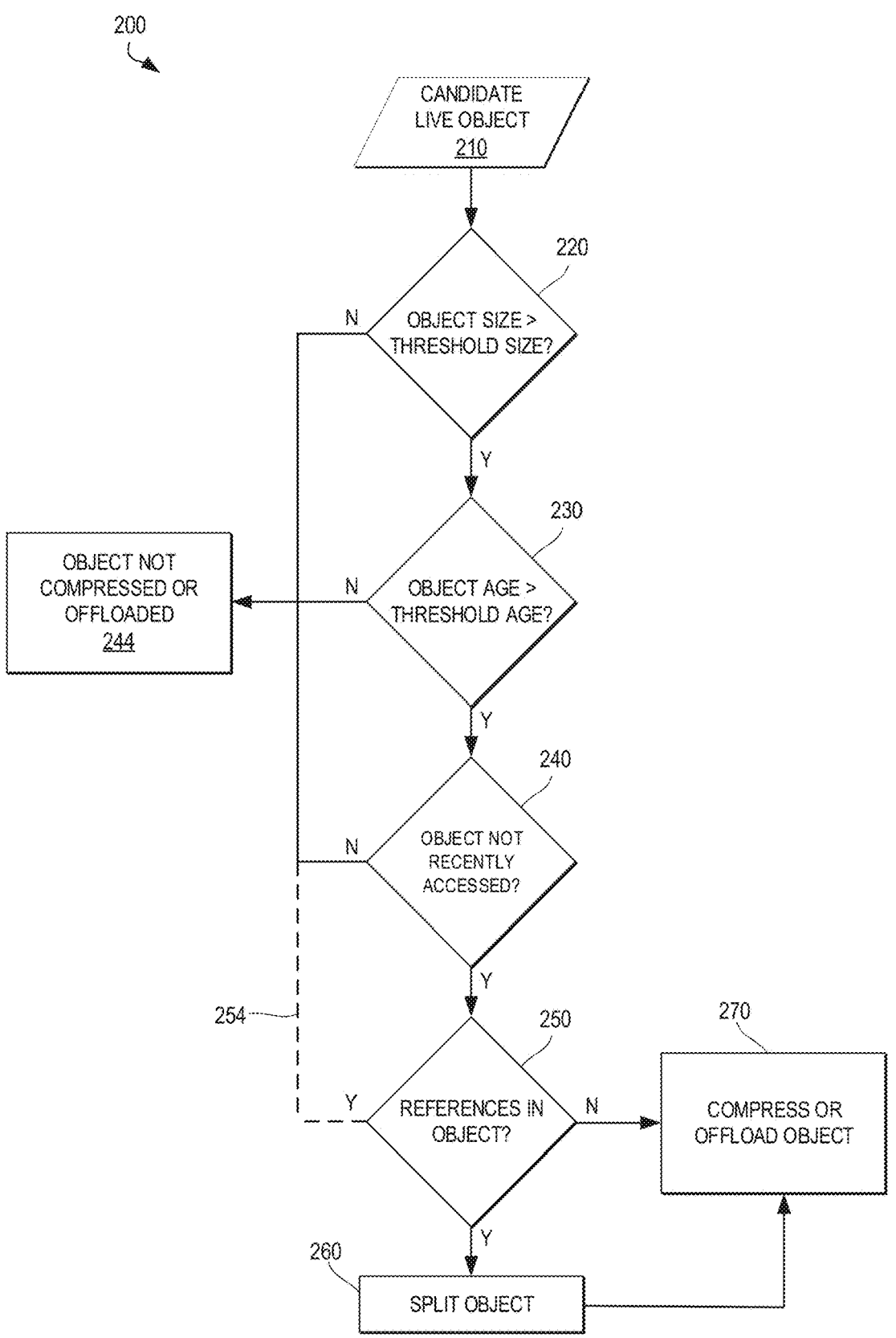
FIG. 2 illustrates an example method of identifying objects for compression or for offloading to secondary memories or storage.

FIG. 2 illustrates an example method of identifying objects for compression or for offloading to secondary memory or storage. The method 200 starts with a candidate live object 210 in heap memory. The candidate object 210 can be one of a plurality of live objects identified as being reachable by an application executing on a computing system. An object can be identified as being reachable by an application by determining that the object is reachable from a set of root objects via one or more references. The method 200 can be performed on live objects as they are identified during a garbage collection marking phase or after completion of a marking phase.

At 220, it is determined whether the object has a size greater than a threshold size. The threshold size can be fixed or configurable. In some embodiments, a computing system can adjust the threshold size based on system performance or characteristics. For example, a runtime can generate metrics such as a rate at which objects are compressed, a rate at which objects are offloaded to secondary storage or memory, time spent compressing objects (e.g., average, cumulative), and time spent offloading objects (e.g., average, cumulative). The runtime can automatically adjust the threshold size based on an analysis of these metrics, as well as compression accelerator information, such as throughput, latency, and availability. In some embodiments, an entity other than the runtime can analyze these metrics and provide an updated threshold size to the runtime, such as an operating system or a remote entity (e.g., cloud-based orchestrator). In embodiments with memory managers that already partition objects into small and large object heaps based on their size upon allocation, determining whether the candidate object 210 has a size greater than a threshold size can comprise determining whether the candidate object 210 is located in the large object heap.

At 230, it is determined whether an age of the candidate object 210 is greater than a threshold age. In some embodiments, the age of an object is indicated by garbage collection information associated with the object, the garbage collection information providing a measure of how many garbage collections the object has survived without being deallocated. In embodiments where a generational garbage collection memory management approach is used, the object comprises garbage collection generation information indicating a generation that the object belongs to. In general, objects having survived more garbage collections belong to an older generation. Garbage collection information for an object can be updated during garbage collection. In these embodiments, determining whether the age of an object exceeds a threshold age comprises determining whether the garbage collection generation information satisfies a garbage collection generation criterion, such as the generation of the object is greater than or equal to a threshold generation number, or that the generation of the object matches a certain generation number.

In other embodiments, the garbage collection information comprises the actual number of garbage collections that the object has survived. The garbage collection information associated with an object can be stored in the object header. In other embodiments, the age of an object is not related to garbage collection survival and can be reflected in age information indicating alternatives measures of object age, such as a time at which the object was created or a time at which the object was loaded from secondary memory or storage.

At 240, it is determined whether the candidate object 210 has not been recently accessed. In some embodiments, determining whether the candidate object has not been recently accessed comprises determining whether the time at which the object was last accessed is longer than a threshold time. In some embodiments, the garbage collections are numbered with an epoch number and a garbage collection epoch field is included in the object header. The garbage collection epoch field is updated with the current garbage collection epoch number when an object is accessed. For example, if a garbage collection having an epoch number of 50 is performed, any object accessed after this garbage collection and before the next one would have its garbage collection epoch number updated to 50. Determining whether an object has been last accessed within a threshold time then comprises determining whether the garbage collection epoch number satisfies a garbage collection epoch criterion. The garbage collection epoch criterion can be, for example, that the garbage collection epoch number of the object is less than a threshold epoch number (if epochs are numbered in ascending order), greater than a threshold epoch number (if epochs are numbered in descending order), or within a certain number of garbage collection epochs from the current epoch. In some embodiments, garbage collection epochs can be assigned identifiers other than numbers and determining whether the object has not been recently accessed comprises determining whether a garbage collection epoch identifier associated with the object satisfies a garbage collection epoch criterion.

Other garbage collection criteria can be used to determine whether an object's age exceeds a threshold age. For example, in some embodiments, an object header can comprise most recent access information that is updated when the object is accessed. In such embodiments, determining whether the object has not been recently accessed can comprise determining whether the most recent access information satisfies a most recent access information criterion. In some embodiments, the most recent access information can be a most recent access timestamp, and the most recent access information criterion can be whether the timestamp is before a threshold time or within a threshold time period from a current time.

If the candidate object is smaller than the threshold size, younger than the threshold age, or has been recently accessed, the method 200 proceeds to 244, and the candidate object 210 is not compressed or offloaded to secondary memory or storage. If the object satisfies the size, age, and recent access criteria of 220, 230, and 240, the method 200 proceeds to 250. At 250, it is determined whether the object comprises references to other objects. If the candidate object 210 comprises one or more references (e.g., pointers) to other objects, the object 210 is split into two sub-objects at 260, a first sub-object comprising the reference fields of the object 210 and a second sub-object comprising the value fields of the object 210. The first sub-object comprises a reference to the second sub-object. The second sub-object comprising the value fields can be compressed or offloaded and the first sub-object comprising the reference fields is not compressed or offloaded. The splitting of the candidate object 210 into two sub-objects prevents having to decompress a compressed object or load a previously offloaded object from secondary memory or storage to retrieve references contained in the object. During subsequent garbage collections, the uncompressed first sub-object that is still in heap memory is accessed to identify objects reachable from the original candidate object. In an alternative embodiment, as illustrated by the dashed "Yes" branch 254, the method 200 does not split the object into sub-objects in response to determining that the object comprises references to other objects. If a candidate object 210 does not contain a reference to another object, such as an object comprising arrays of primitive data types, the object is offloaded or compressed at 270.

Figure 3:
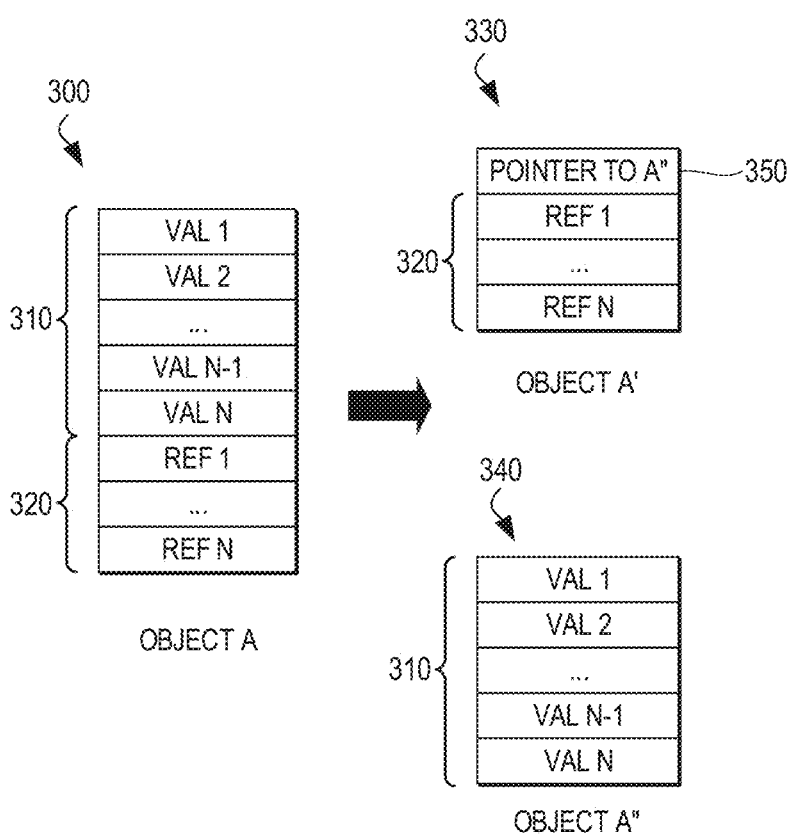
FIG. 3 illustrates an example splitting of an object comprising references to other objects.

FIG. 3 illustrates an example splitting of an object comprising references to other objects. An object A 300 comprises a plurality of value fields 310 and a plurality of reference fields 320 referencing other objects. The object A 300 is split into two sub-objects, a first sub-object A' 330 comprising the plurality of reference fields 320 and a second sub-object A" 340 comprising the plurality of value fields 310. The first sub-object 330 comprises a pointer 350 to the second sub-object A" 340.

At 270, a candidate object that satisfies the size, age, and most recent access criteria of 220, 230, and 240, and that has been split into sub-objects if the candidate object comprises at least one reference to another object is compressed or offloaded to a secondary memory or storage. Candidate objects that are compressed can be compressed using existing compression algorithms or a compression accelerator, such as an in-memory analytic accelerator, Intel® Data Stream Accelerator, or Intel® QuickAssist Technology. In some embodiments, objects can be compressed utilizing accelerators located on the same integrated circuit die or in the same integrated circuit component as a processing unit that performs any of the memory management methods disclosed herein. In some embodiments, the decision to compress or offload an object to secondary memory or storage can be based on factors such as compression accelerator availability, latency, and throughput; compression algorithm latency; processing unit utilization; memory interface bandwidth utilization, memory or storage read/write times, and other performance metrics or characteristics of computing system components. Utilizing compression accelerators can reduce the offloading of objects to secondary memory and storage, which can result in reduced system cost through the use of less secondary memory or storage (e.g., DRAM, solid-state drives (SSDs), or other persistent memory). This can reduce computing system cost for runtime system vendors, developers, or Cloud Service Providers (CSPs).

In some embodiments, an object header can comprise compression hint information that can include compression or offload history and developer attributes for the object that can be used in determining whether to compress or offload an object. For example, compression hint information can comprise a one-bit or two-bit saturation counter that indicates whether the object has been recently compressed or whether the object has been offloaded when the object has been selected for compression or offloading.

Figures 4A, 4B:
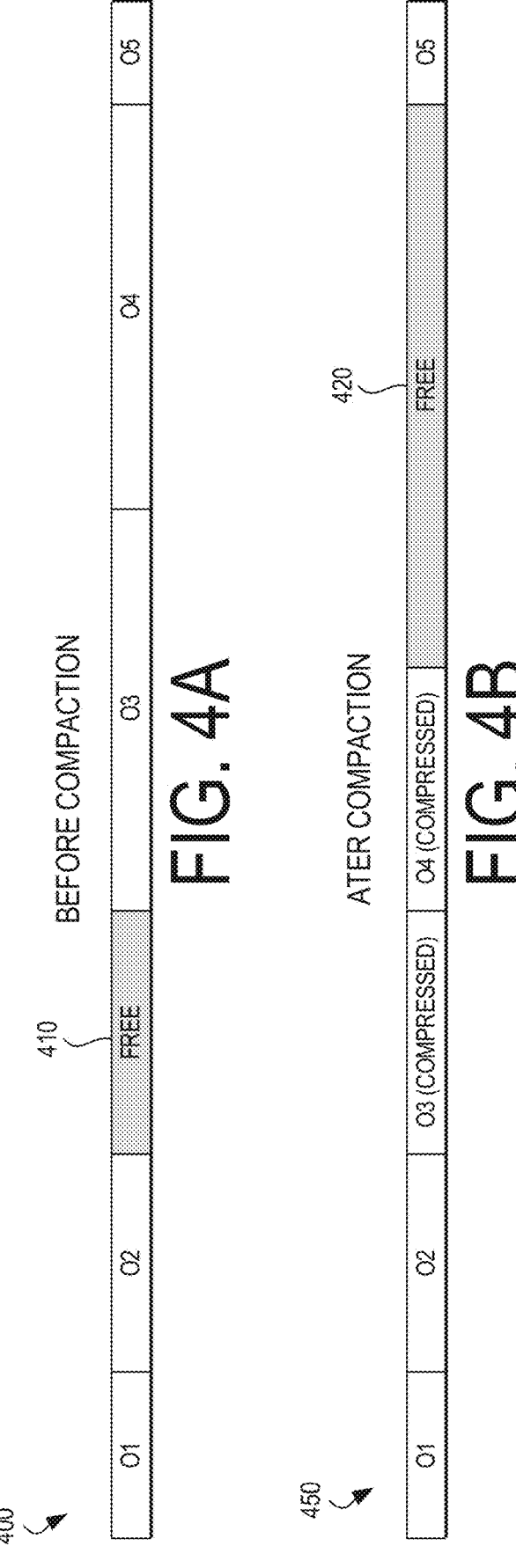
FIGS. 4A & 4B illustrate an example compaction of a large object heap.

In some embodiments, the method 200 can further comprise compacting at least a portion of the memory in which the candidate object 210 is stored prior to compression or offloading. FIGS. 4A & 4B illustrate an example compaction of a large object heap. A large object heap 400 comprises objects O1 through O5 with a free memory segment 410 located between objects O2 and O3. Objects O3 and O4 have been identified for compression. FIGS. 4A & 4B illustrate the large object heap 400 before and after compression of objects O3 and O4 and compaction of the large object heap 400, respectively. As can be seen, objects O3 and O4 take up less space after compression and compaction of the large object heap 400 has created a free memory segment 420 that is larger than the free memory segment 410. Thus, compression and compaction of the large object heap 400 results in the creation of a larger contiguous portion of free memory within the large object heap 400 that can be used for the allocation of large objects. Through compression and compaction of objects, a computing system may be able to handle larger data sets without the amount of secondary memory or storage in the computing system having to be increased.

When an object that has been compressed or offloaded to secondary memory or storage is subsequently needed by an application, the object can be decompressed or loaded back into heap memory from secondary memory or storage. Objects that were split into sub-objects can be restored by rejoining their associated sub-objects.

In some embodiments, additional modifications are made to a runtime in addition to the modifications to its memory management procedures to identify candidate objects for compression or offloading, to split candidate objects with references, and to compress or offload candidate objects. These additional runtime modifications can comprise updating a just-in-time compiler so that it knows how to reference values in a split object.

Although the enhanced memory management technologies disclosed herein have been discussed primarily in reference to garbage collection-based memory managers, they can also be used in memory managers that do not employ garbage collectors, such as reference counter-based memory managers. In some such embodiments, the runtime can maintain an object dictionary comprising references to objects in heap memory and object entries that each comprise information indicating the most recent access to those objects and those objects' sizes. In some embodiments, pointers can be added to the object dictionary based on criteria such as object size and most recent access. For example, pointers can be added to the object dictionary that allow a runtime to traverse through the object dictionary to identify objects having an object size greater than a threshold size. In some embodiments, prioritized objects (those satisfying size and last access time criteria) in the heap memory can be asynchronously compressed and can use hardware accelerators to perform the compression.

FIG. 5 is a simplified block diagram of a first example computing system in which technologies described herein may be implemented. The computing system 500 can be any of the computing systems described or referenced herein, such as a server. The computing system 500 comprises a hardware platform 510 upon which a software environment 520 operates. The hardware platform 510 comprises an integrated circuit component 524, DRAM 528, and secondary memory and storage 530. The integrated circuit component 524 comprises processing units 532 and 534 that each contain an L1 cache 536, L2 cache 538, and an L3 cache 540. The two processing units 532 and 534 share an LLC 542. The integrated circuit component 524 further comprises a compression accelerator 544. The secondary memory and storage 530 comprises one or more of phase-change memory 546, flash memory 548, a solid-state drive 550, and optional hard disk drive 552.

The software environment 520 comprises a managed runtime 560, one or more applications 564, and a heap memory 568. The managed runtime 560 supports execution of the applications 564 by performing automated memory management and other execution support tasks. The managed runtime 560 comprises a memory manager 570. In some embodiments, the memory manager 570 is a garbage collector-based memory manager that comprises a garbage collector 572 and in other embodiments, the memory manager is a reference counter-based memory manager that comprises a reference counter 576 and an object dictionary 580. The heap memory 568 comprises objects 584. In some embodiments, the runtime 560 partitions the objects 584 into a small object heap 588 and a large object heap 592 based on object size at the time of object allocation.

Either or both of the processing units 532 and 534 can perform any of the memory management methods described herein. The heap memory 568 can be stored in the L1 through L3 caches 536-540, the LLC 542, and the DRAM 528. When one of the objects 584 is identified for compression or offloading, the object can be offloaded to the secondary memory and storage 530 and can be stored in the PCM 546, flash 548, SSD 550, or HDD 552. The compression accelerator 544 can perform object compression.

Figure 6:
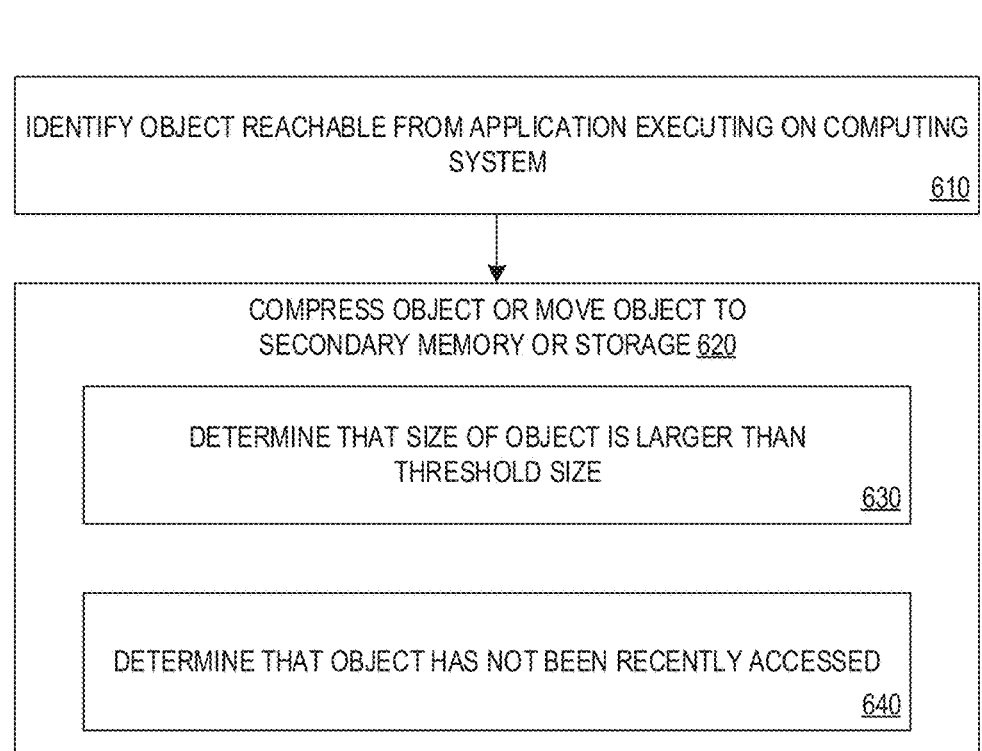
FIG. 6 is an example managed runtime memory management method.

FIG. 6 is an example managed runtime memory management method. The method can be performed by any computing system described or referenced herein, such as a laptop computer. At 610, an object that is reachable from an application executing on a computing system is identified. At 620, the object is compressed or the object is moved to one or more secondary memories or storage. The compressing or the moving is performed in response to: at 630, determining that a size of the object is larger than a threshold size; and, at 640, determining that the object has not been recently accessed.

In other embodiments, the method 600 can comprise one or more additional elements. For example, the method 600 can further comprise compacting at least a portion of the heap memory in which the object is stored, the compacting being performed in response to compressing the object or moving the object. In another example, the method 600 can further comprise splitting the object into a first sub-object comprising the value fields and a second sub-object comprising the reference fields, the compressing the object or the moving the object comprising compressing the first sub-object or moving the first sub-object to the one or more secondary memories or storage and not compressing the second sub-object or not moving the second sub-object to the one or more secondary memories or storage.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blades, trays, sleds)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components.

Figure 7:
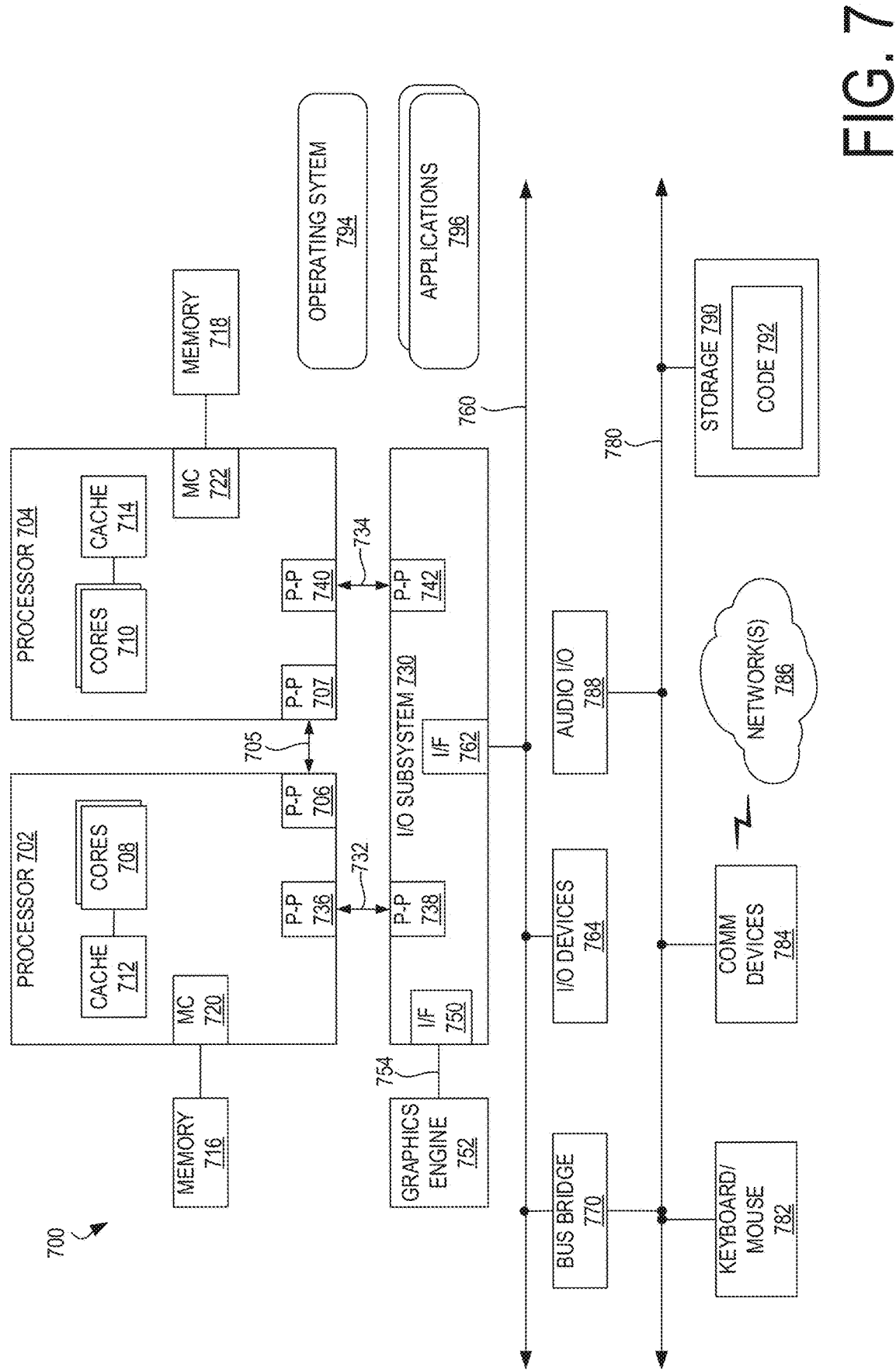
FIG. 7 is a block diagram of a second example computing system in which technologies described herein may be implemented.

FIG. 7 is a block diagram of a second example computing system in which technologies described herein may be implemented. Generally, components shown in FIG. 7 can communicate with other shown components, although not all connections are shown, for ease of illustration. The computing system 700 is a multiprocessor system comprising a first processing unit 702 and a second processing unit 704 comprising point-to-point (P-P) interconnects. A point-to-point (P-P) interface 706 of the processing unit 702 is coupled to a point-to-point interface 707 of the processing unit 704 via a point-to-point interconnection 705. It is to be understood that any or all of the point-to-point interconnects illustrated in FIG. 7 can be alternatively implemented as a multi-drop bus, and that any or all buses illustrated in FIG. 7 could be replaced by point-to-point interconnects.

The processing units 702 and 704 comprise multiple processor cores. Processing unit 702 comprises processor cores 708 and processing unit 704 comprises processor cores 710. Processor cores 708 and 710 can execute computer-executable instructions in a manner similar to that discussed below in connection with FIG. 8, or other manners.

Processing units 702 and 704 further comprise cache memories 712 and 714, respectively. The cache memories 712 and 714 can store data (e.g., instructions) utilized by one or more components of the processing units 702 and 704, such as the processor cores 708 and 710. The cache memories 712 and 714 can be part of a memory hierarchy for the computing system 700. For example, the cache memories 712 can locally store data that is also stored in a memory 716 to allow for faster access to the data by the processing unit 702. In some embodiments, the cache memories 712 and 714 can comprise multiple cache levels, such as level 1 (L1), level 2 (L2), level 3 (L3), level 4 (L4), and/or other caches or cache levels, such as a last level cache (LLC). Some of these cache memories (e.g., L2, L3, L4, LLC) can be shared among multiple cores in a processing unit. One or more of the higher levels of cache levels (the smaller and faster caches) in the memory hierarchy can be located on the same integrated circuit die as a processor core and one or more of the lower cache levels (the larger and slower caches) can be located on an integrated circuit die that is physically separate from the processor core integrated circuit dies.

Although the computing system 700 is shown with two processing units, the computing system 700 can comprise any number of processing units. Further, a processing unit can comprise any number of processor cores. A processing unit can take various forms such as a central processing unit (CPU), a graphics processing unit (GPU), general-purpose GPU (GPGPU), accelerated processing unit (APU), field-programmable gate array (FPGA), neural network processing unit (NPU), data processing unit (DPU), accelerator (e.g., graphics accelerator, digital signal processor (DSP), compression accelerator, artificial intelligence (AI) accelerator), controller, or other types of processing units. As such, the processing unit can be referred to as an XPU (or xPU). Further, a processing unit can comprise one or more of these various types of processing units. In some embodiments, the computing system comprises one processing unit with multiple cores, and in other embodiments, the computing system comprises a single processing unit with a single core. As used herein, the terms "processor unit" and "processing unit" can refer to any processor, processor core, component, module, engine, circuitry, or any other processing element described or referenced herein.

In some embodiments, the computing system 700 can comprise one or more processing units that are heterogeneous or asymmetric to another processing unit in the computing system. There can be a variety of differences between the processing units in a system in terms of a spectrum of metrics of merit including architectural, micro-architectural, thermal, power consumption characteristics, and the like. These differences can effectively manifest themselves as asymmetry and heterogeneity among the processing units in a system.

The processing units 702 and 704 can be located in a single integrated circuit component (such as a multi-chip package (MCP) or multi-chip module (MCM)) or they can be located in separate integrated circuit components. An integrated circuit component comprising one or more processing units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processing unit, or on one or more integrated circuit dies separate from the integrated circuit dies comprising the processing units. In some embodiments, these separate integrated circuit dies can be referred to as "chiplets". In some embodiments where there is heterogeneity or asymmetry among processing units in a computing system, the heterogeneity or asymmetry can be among processing units located in the same integrated circuit component.

Processing units 702 and 704 further comprise memory controller logic (MC) 720 and 722. As shown in FIG. 7, MCs 720 and 722 control memories 716 and 718 coupled to the processing units 702 and 704, respectively. The memories 716 and 718 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 720 and 722 are illustrated as being integrated into the processing units 702 and 704, in alternative embodiments, the MCs can be external to a processing unit.

Processing units 702 and 704 are coupled to an Input/Output (I/O) subsystem 730 via point-to-point interconnections 732 and 734. The point-to-point interconnection 732 connects a point-to-point interface 736 of the processing unit 702 with a point-to-point interface 738 of the I/O subsystem 730, and the point-to-point interconnection 734 connects a point-to-point interface 740 of the processing unit 704 with a point-to-point interface 742 of the I/O subsystem 730.

Input/Output subsystem 730 further includes an interface 750 to couple the I/O subsystem 730 to a graphics engine 752. The I/O subsystem 730 and the graphics engine 752 are coupled via a bus 754.

The Input/Output subsystem 730 is further coupled to a first bus 760 via an interface 762. The first bus 760 can be a Peripheral Component Interconnect Express (PCIe) bus or any other type of bus. Various I/O devices 764 can be coupled to the first bus 760. A bus bridge 770 can couple the first bus 760 to a second bus 780. In some embodiments, the second bus 780 can be a low pin count (LPC) bus. Various devices can be coupled to the second bus 780 including, for example, a keyboard/mouse 782, audio I/O devices 788, and a storage device 790, such as a hard disk drive, solid-state drive, or another storage device for storing computer-executable instructions (code) 792 or data. The code 792 can comprise computer-executable instructions for performing methods described herein. Additional components that can be coupled to the second bus 780 include communication device(s) 784, which can provide for communication between the computing system 700 and one or more wired or wireless networks 786 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 784 support wireless communication, the communication devices 784 can comprise wireless communication components coupled to one or more antennas to support communication between the computing system 700 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 700 can comprise removable memory such as flash memory cards (e.g., SD (Secure Digital) cards), memory sticks, Subscriber Identity Module (SIM) cards). The memory in system 700 (including caches 712 and 714, memories 716 and 718, and storage device 790) can store data and/or computer-executable instructions for executing an operating system 794 and application programs 796. Example data includes web pages, text messages, images, sound files, and video data to be sent to and/or received from one or more network servers or other devices by the system 700 via the one or more wired or wireless networks 786, or for use by the system 700. The system 700 can also have access to external memory or storage (not shown) such as external hard drives or cloud-based storage.

The operating system 794 can control the allocation and usage of the components illustrated in FIG. 7 and support the one or more application programs 796. The application programs 796 can include common computing system applications (e.g., email applications, calendars, contact managers, web browsers, messaging applications) as well as other computing applications.

The computing system 700 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 700. External input and output devices can communicate with the system 700 via wired or wireless connections.

In addition, the computing system 700 can provide one or more natural user interfaces (NUIs). For example, the operating system 794 or applications 796 can comprise speech recognition logic as part of a voice user interface that allows a user to operate the system 700 via voice commands. Further, the computing system 700 can comprise input devices and logic that allows a user to interact with the computing system 700 via body, hand or face gestures.

The system 700 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 700 can further comprise one or more additional antennas coupled to one or more additional receivers, transmitters, and/or transceivers to enable additional functions.

It is to be understood that FIG. 7 illustrates only one example computing system architecture. Computing systems based on alternative architectures can be used to implement technologies described herein. For example, instead of the processing units 702 and 704 and the graphics engine 752 being located on discrete integrated circuits, a computing system can comprise an SoC (system-on-a-chip) integrated circuit incorporating multiple processors, a graphics engine, and additional components. Further, a computing system can connect its constituent components via bus or point-to-point configurations different from that shown in FIG. 7. Moreover, the illustrated components in FIG. 7 are not required or all-inclusive, as shown components can be removed and other components added in alternative embodiments.

Figure 8:
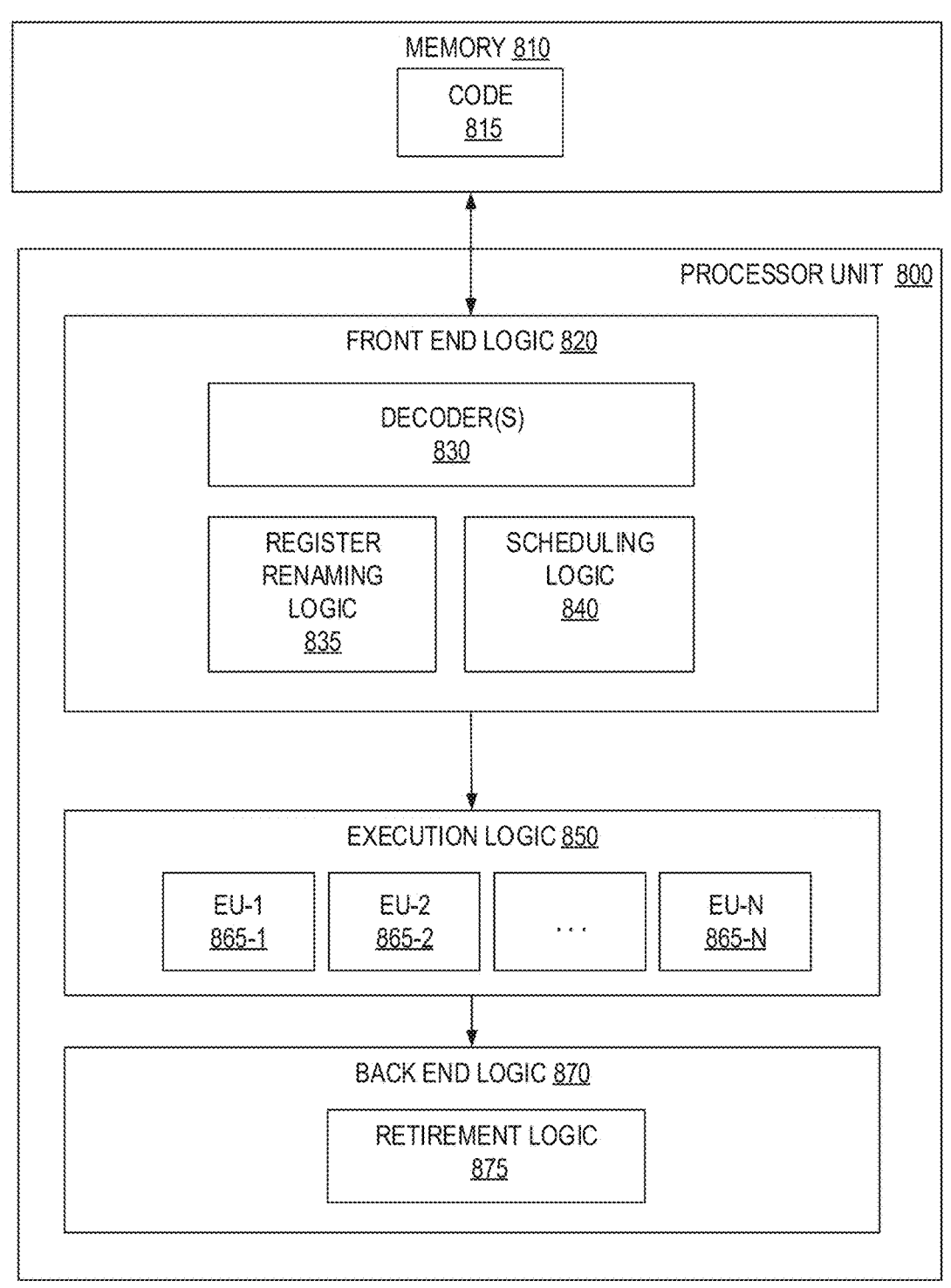
FIG. 8 is a block diagram of an example processing unit to execute computer-executable instructions as part of implementing technologies described herein.

FIG. 8 is a block diagram of an example processing unit 800 to execute computer-executable instructions as part of implementing technologies described herein. The processing unit 800 can be a single-threaded core or a multithreaded core in that it may include more than one hardware thread context (or "logical processor") per processing unit.

FIG. 8 also illustrates a memory 810 coupled to the processing unit 800. The memory 810 can be any memory described herein or any other memory known to those of skill in the art. The memory 810 can store computer-executable instructions 815 (code) executable by the processor core 800.

The processing unit comprises front-end logic 820 that receives instructions from the memory 810. An instruction can be processed by one or more decoders 830. The decoder 830 can generate as its output a micro-operation such as a fixed width micro operation in a predefined format, or generate other instructions, microinstructions, or control signals, which reflect the original code instruction. The front-end logic 820 further comprises register renaming logic 835 and scheduling logic 840, which generally allocate resources and queue operations corresponding to converting an instruction for execution.

The processing unit 800 further comprises execution logic 850, which comprises one or more execution units (EUs) 865-1 through 865-N. Some processing unit embodiments can include a number of execution units dedicated to specific functions or sets of functions. Other embodiments can include only one execution unit or one execution unit that can perform a particular function. The execution logic 850 performs the operations specified by code instructions. After completion of execution of the operations specified by the code instructions, back-end logic 870 retires instructions using retirement logic 875. In some embodiments, the processing unit 800 allows out of order execution but requires in-order retirement of instructions. Retirement logic 875 can take a variety of forms as known to those of skill in the art (e.g., re-order buffers or the like).

The processing unit 800 is transformed during execution of instructions, at least in terms of the output generated by the decoder 830, hardware registers and tables utilized by the register renaming logic 835, and any registers (not shown) modified by the execution logic 850.

As used herein, the term "module" refers to logic that may be implemented in a hardware component or device, software or firmware running on a processing unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processing units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processing units capable of executing computer-executable instructions to perform any of the disclosed methods. As used herein, the term "computer" refers to any computing system or device described or mentioned herein. Thus, the term "computer-executable instruction" refers to instructions that can be executed by any computing system or device described or mentioned herein.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile-memory), optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: identifying an object reachable from an application executing on a computing system; and compressing the object or moving the object to one or more secondary memories or storage, the compressing or the moving being performed in response to: determining that a size of the object is larger than a threshold size; and determining that the object has not been recently accessed.

Example 2 comprises the method of Example 1, wherein the determining that the size of the object is larger than a threshold size comprises determining that the object is located in a large object heap.

Example 3 comprises the method of Example 1, wherein the compressing or the moving is performed in further response to determining that an age of the object is greater than a threshold age.

Example 4 comprises the method of Example 3, wherein the object comprises garbage collection generation information, the determining that the age of the object is greater than the threshold age comprises determining that the garbage collection generation information satisfies a garbage collection generation criterion.

Example 5 comprises the method of Example 1, wherein the object comprises a garbage collection epoch number, the determining that the object has not been recently accessed comprises determining that the garbage collection epoch number satisfies a garbage collection epoch criterion.

Example 6 comprises the method of Example 1, wherein the object comprises a most recent access timestamp, the determining that the object has not been recently accessed comprises determining that the most recent access timestamp satisfies a most recent access information criterion.

Example 7 comprises the method of Example 1, wherein the object comprises compression hint information, the compressing the object or the moving the object comprising determining whether to compress the object or move the object based on the compression hint information.

Example 8 comprises the method of Example 7, wherein the compression hint information comprises a saturation counter indicating whether the object was recently compressed or whether the object was recently moved to the one or more secondary memories or storage.

Example 9 comprises the method of Example 1, wherein the object is stored in a heap memory, the method further comprising compacting at least a portion of the heap memory in response to compressing the object or moving the object to the one or more secondary memories or storage.

Example 10 comprises the method of Example 1, wherein the object is compressed and compressing the object is performed using a compression accelerator.

Example 11 comprises the method of Example 10, wherein the method is executed by an integrated circuit component and the integrated circuit component comprises the compression accelerator.

Example 12 comprises the method of Example 1, the object comprising one or more reference fields and one or more value fields, the method further comprising splitting the object into a first sub-object comprising the value fields and a second sub-object comprising the reference fields, the compressing the object or the moving the object comprising compressing the first sub-object or moving the first sub-object to the one or more secondary memories or storage and not compressing the second sub-object or not moving the second sub-object to the one or more secondary memories or storage.

Example 13 comprises the method of Example 12, wherein the second sub-object comprises a reference to the first sub-object.

Example 14 comprises the method of Example 1, further comprising, if the object was compressed, decompressing the object prior to the application accessing the object.

Example 15 comprises the method of Example 1, wherein the object was stored in one or more memories prior to being moved to the one or more secondary memories or storage, the method further comprising loading the object back into the one or more memories prior to an access to the object by the application.

Example 16 comprises the method of Example 1, wherein the object is moved to the secondary memories or storage and prior to the moving, the object is stored in one or more memories located at a higher level in a memory hierarchy of the computing system than the one or more secondary memories or storage.

Example 17 comprises the method of Example 16, wherein the one or more memories comprise volatile memories and the one or more secondary memories or storage comprise non-volatile memories.

Example 18 comprises the method of Example 1, wherein the one or more secondary memories or storage comprise a solid-state drive.

Example 19 comprises the method of Example 1, wherein the one or more secondary memories or storage comprise a hard disk drive.

Example 20 comprises the method of Example 1, wherein the one or more secondary memories or storage comprise a flash memory.

Example 21 comprises the method of Example 1, further comprising maintaining an object dictionary comprising a plurality of object entries, individual of the object entries associated with an object reachable by the application and comprising an object size and access information indicating how recently the individual object has been accessed, the determining that the object size is larger than a threshold size comprising referencing the object dictionary to determine the size of the object, the determining that the object has not been recently accessed comprising referencing the object dictionary to determine how recently the object has been accessed.

Example 22 comprises the method of Example 1, further comprising determining the threshold size based on one or more compression accelerator characteristics.

Example 23 is a computing system, comprising: one or more processing units; one or more secondary memories or storage; and one or more computer-readable storage media storing computer-executable instructions for causing the one or more processing units to perform any one of the methods of Example 1-22.

Example 24 is a computing system comprising: one or more secondary memories or storage; one or more computer-readable storage media storing computer-executable instructions for causing the computing system to identify an object reachable from an application executing on the computing system; and a memory management means to determine whether to compress the object or move the object to the one or more secondary memories or storage, and to compress the object or move the object to the one or more secondary memories or storage.

Example 25 is one or more computer-readable storage media storing computer-executable instructions for causing a computing system to perform any one of the methods of Example 1-22.

Example 26 is an apparatus comprising one or more means to perform any one of the methods of Example 1-22.

The invention claimed is:

1. A method comprising:

identifying an object located in volatile memory of a computing system and reachable from an application executing on the computing system;

compressing the object to create a compressed object, the compressing being performed in response to:

determining that a size of the object is larger than a threshold size; and determining that the object has not been recently accessed;

storing the compressed object in a heap memory in a region of the volatile memory that stores compressed objects intermingled with uncompressed objects; and compressing the heap memory in response to compressing the object.

2. The method of claim 1, wherein the determining that the size of the object is larger than a threshold size comprises determining that the object is located in a large object heap.

3. The method of claim 1, wherein the compressing is performed in further response to determining that an age of the object is greater than a threshold age.

4. The method of claim 3, wherein the object comprises garbage collection generation information, the determining that the age of the object is greater than the threshold age comprises determining that the garbage collection generation information satisfies a garbage collection generation criterion.

5. A computing system, comprising:

one or more processing units; and one or more computer-readable storage media storing computer-executable instructions that, when executed, cause the one or more processing units to:

identify an object stored in volatile memory of the one or more computer-readable storage media and reachable from an application executing on the computing system;

compress the object to create a compressed object, to compress the object to be performed in response to:

determining that a size of the object is larger than a threshold size; and determining that the object has not been recently accessed;

store the compressed object in a heap memory in a region of the volatile memory that stores compressed objects intermingled with uncompressed objects; and compact at least a portion of the heap memory in response to compressing the object.

6. The computing system of claim 5, wherein to compress the object is to be performed in further response to determining that an age of the object is greater than a threshold age.

7. The computing system of claim 6, wherein the object comprises garbage collection generation information, the determining that the age of the object is greater than the threshold age comprises determining that the garbage collection generation information satisfies a garbage collection generation criterion.

8. The computing system of claim 5, wherein to compress the object is to be performed by a compression accelerator.

9. One or more computer-readable storage media storing computer-executable instructions for causing a computing system to:

identify an object located in volatile memory of the one or more computer-readable storage media and reachable from an application executing on the computing system, wherein the object comprises one or more reference fields and one or more value fields;

split the object into a first sub-object comprising the one or more value fields and a second sub-object comprising the one or more reference fields;

compress the object to create a compressed object, wherein to compress the object comprises to compress the first sub-object and to not compress the second sub-object and to compress the object to be performed in response to:

determining that a size of the object is larger than a threshold size; and determining that the object has not been recently accessed; and store the compressed object in a region of the volatile memory that stores compressed objects intermingled with uncompressed objects.

10. The one or more computer-readable storage media of claim 9, wherein to compress the object is performed in further response to determining that an age of the object is greater than a threshold age.

11. The one or more computer-readable storage media of claim 10, wherein the object comprises garbage collection generation information, the determining that the age of the object is greater than the threshold age comprises determining that the garbage collection generation information satisfies a garbage collection generation criterion.

12. The one or more computer-readable storage media of claim 9, wherein the object comprises compression hint information, to compress the object comprising to determine whether to compress the object based on the compression hint information.

13. The one or more computer-readable storage media of claim 12, wherein the compression hint information comprises a saturation counter indicating whether the object was recently compressed.

14. The one or more computer-readable storage media of claim 9, the computer-executable instructions to further cause the computing system to maintain an object dictionary comprising a plurality of object entries, individual of the plurality of object entries associated with an object reachable by the application and comprising an object size and access information indicating how recently the individual object has been accessed, the determining that the object size is larger than a threshold size comprising referencing the object dictionary to determine the size of the object, the determining that the object has not been recently accessed comprising referencing the object dictionary to determine how recently the object has been accessed.

* * * * *